March 27, 1945.  G. C. BRUEN  2,372,249
CARD FILING EQUIPMENT
Filed April 3, 1943  8 Sheets-Sheet 2
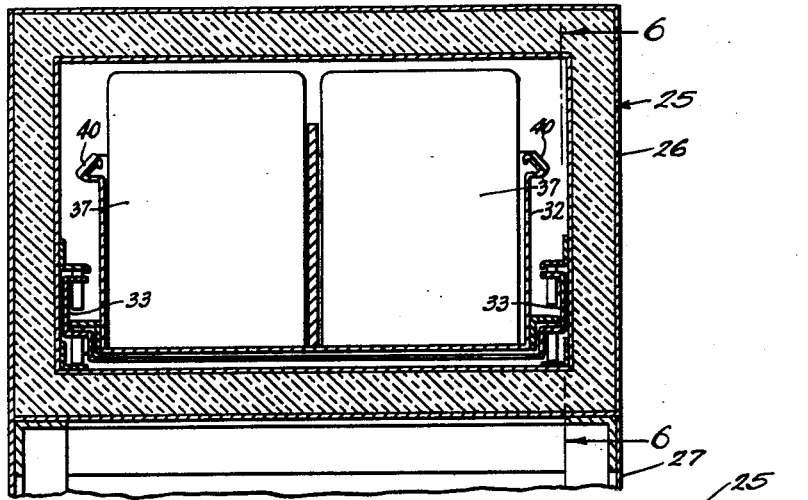
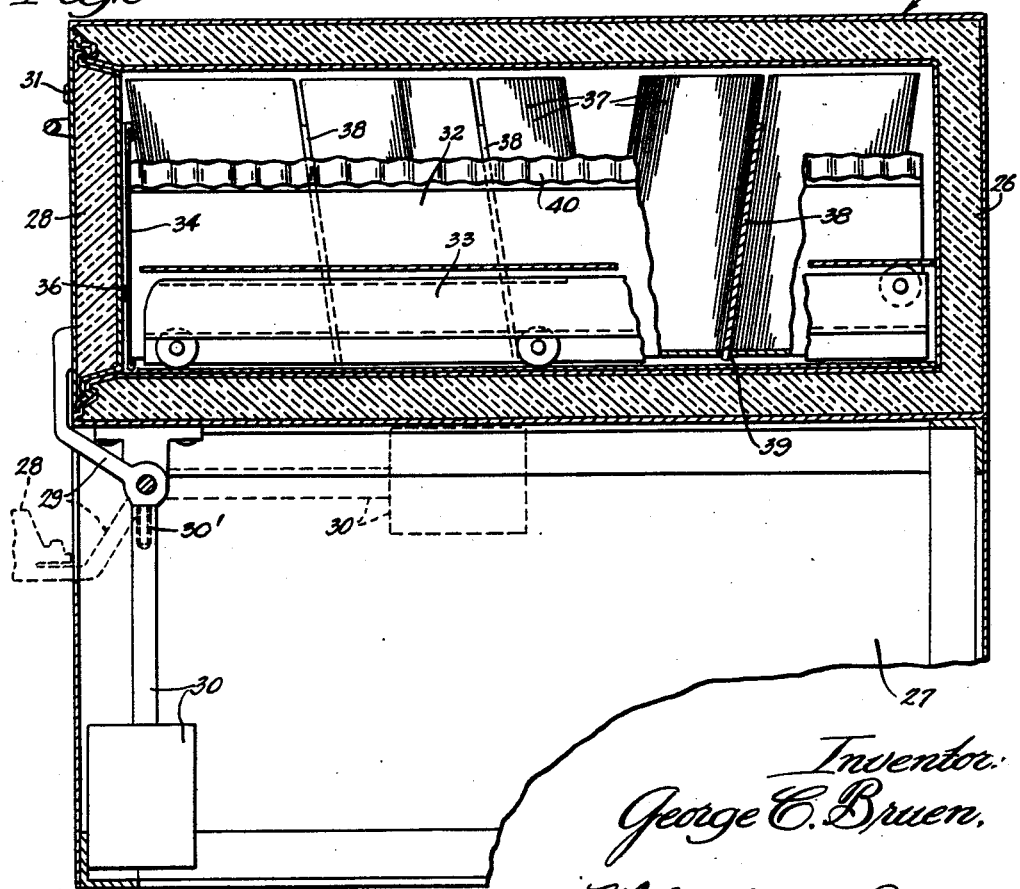
Inventor:
George C. Bruen.
By McCabb, Hand and Dickinson,
Attorneys.

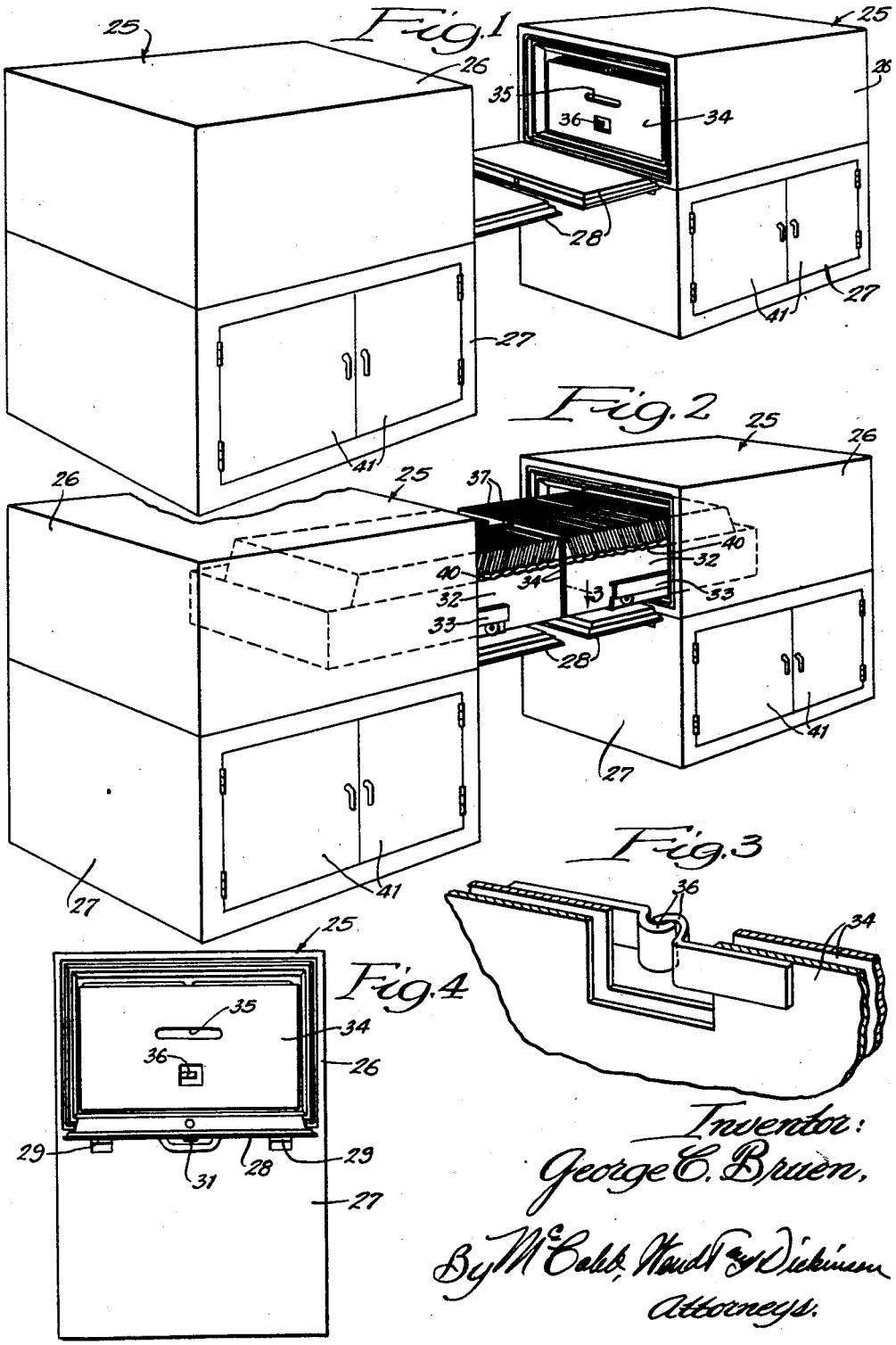
March 27, 1945.   G. C. BRUEN   2,372,249
CARD FILING EQUIPMENT
Filed April 3, 1943   8 Sheets-Sheet 1
Inventor:
George C. Bruen,
By McCabb, Hardt & Dickinson
Attorneys.

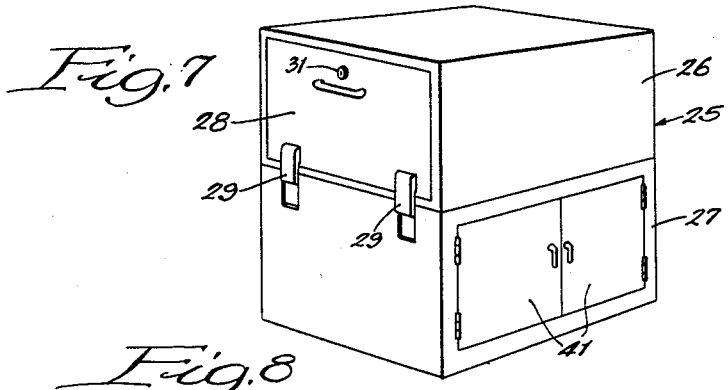
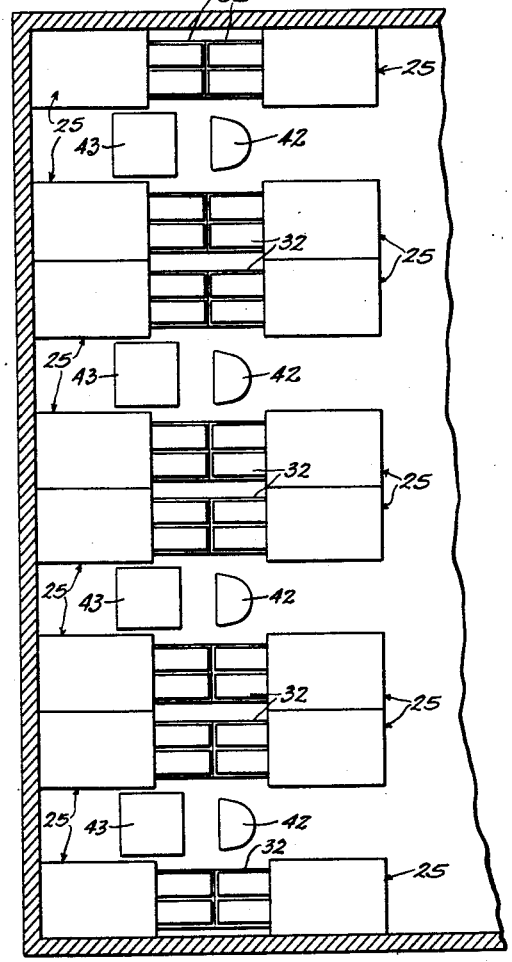
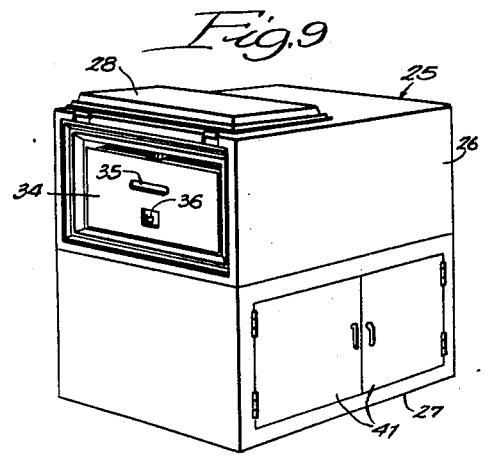

March 27, 1945.   G. C. BRUEN   2,372,249
CARD FILING EQUIPMENT
Filed April 3, 1943   8 Sheets-Sheet 4
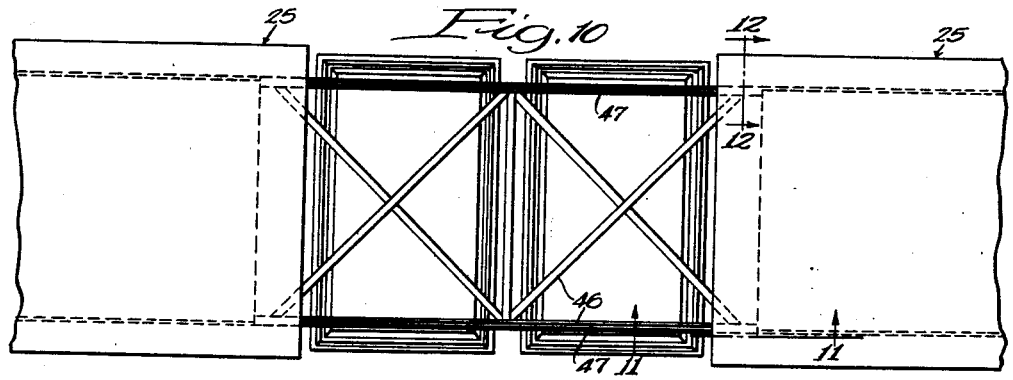
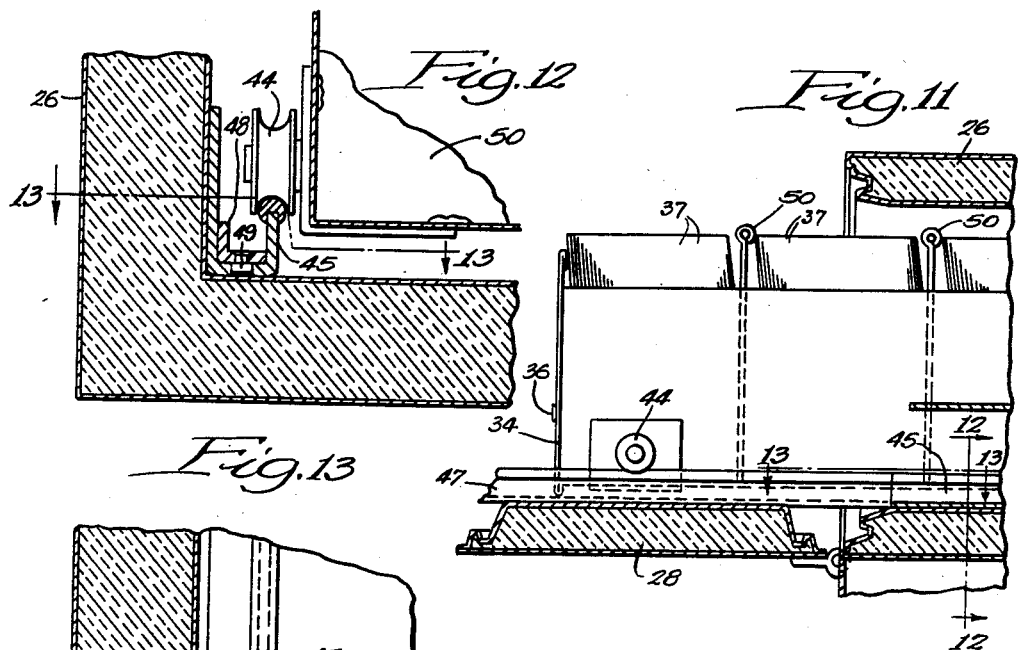
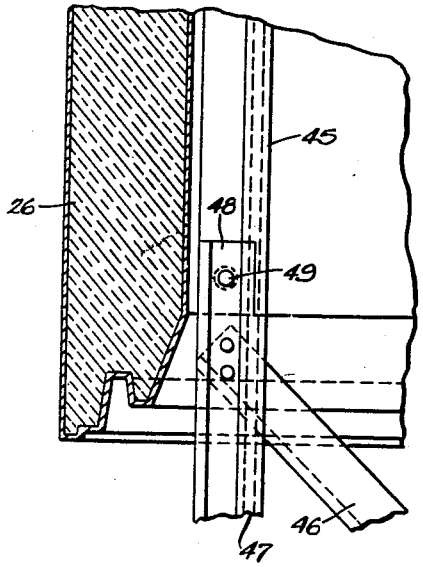
Inventor:
George C. Bruen,
By McCaleb, Hendry, Dickinson,
Attorneys.

March 27, 1945.  G. C. BRUEN  2,372,249
CARD FILING EQUIPMENT
Filed April 3, 1943  8 Sheets-Sheet 5
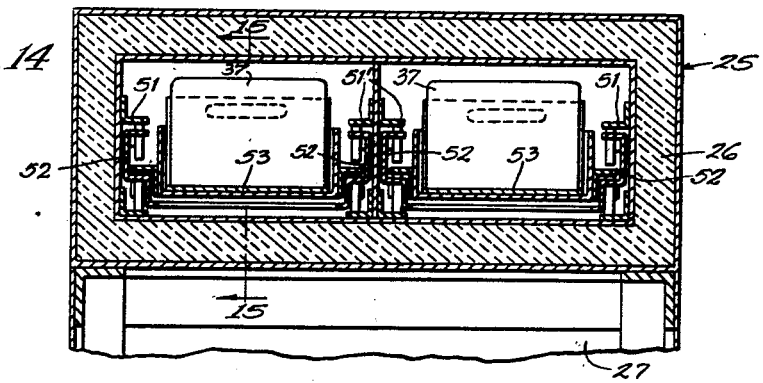
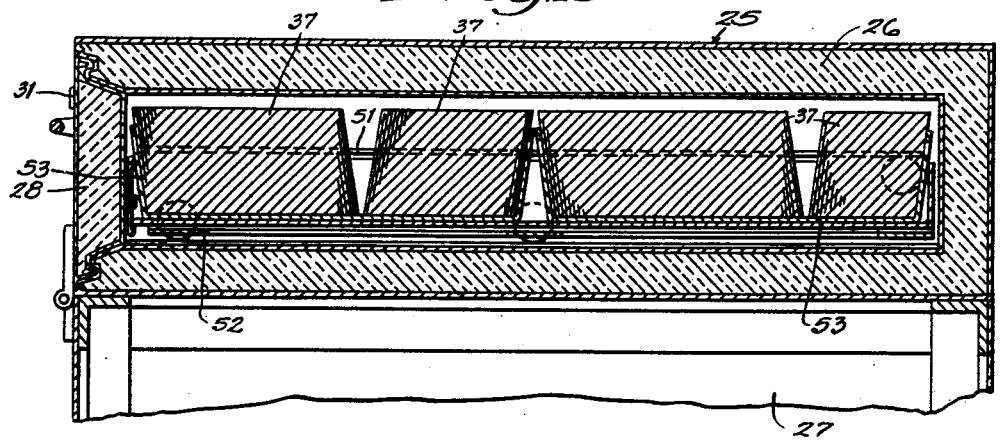
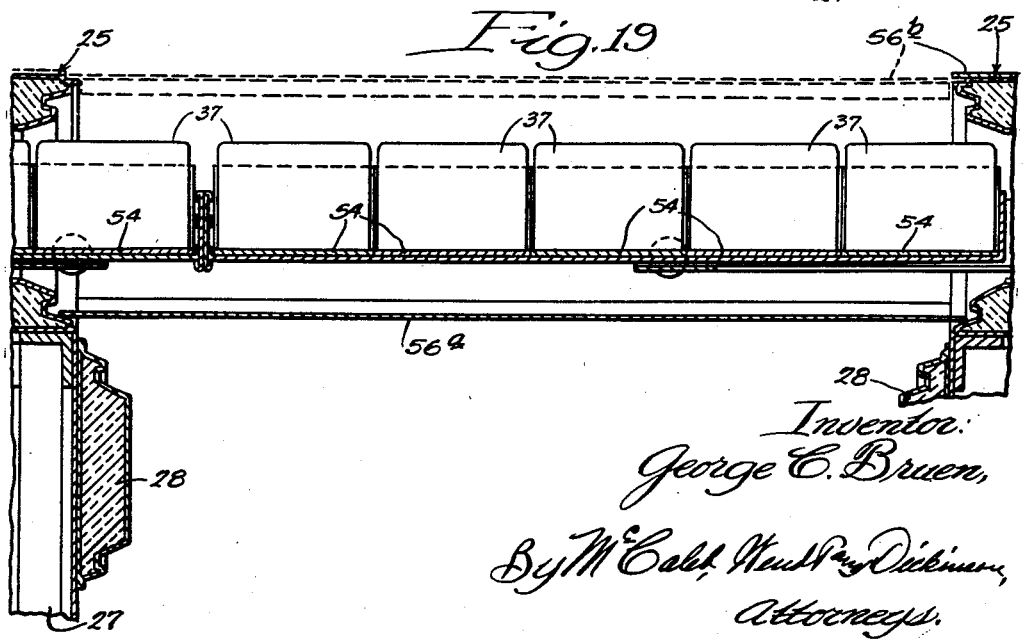
Inventor:
George C. Bruen,
By McCaleb, Hendry and Dickinson,
Attorneys.

March 27, 1945. G. C. BRUEN 2,372,249
CARD FILING EQUIPMENT
Filed April 3, 1943 8 Sheets-Sheet 6
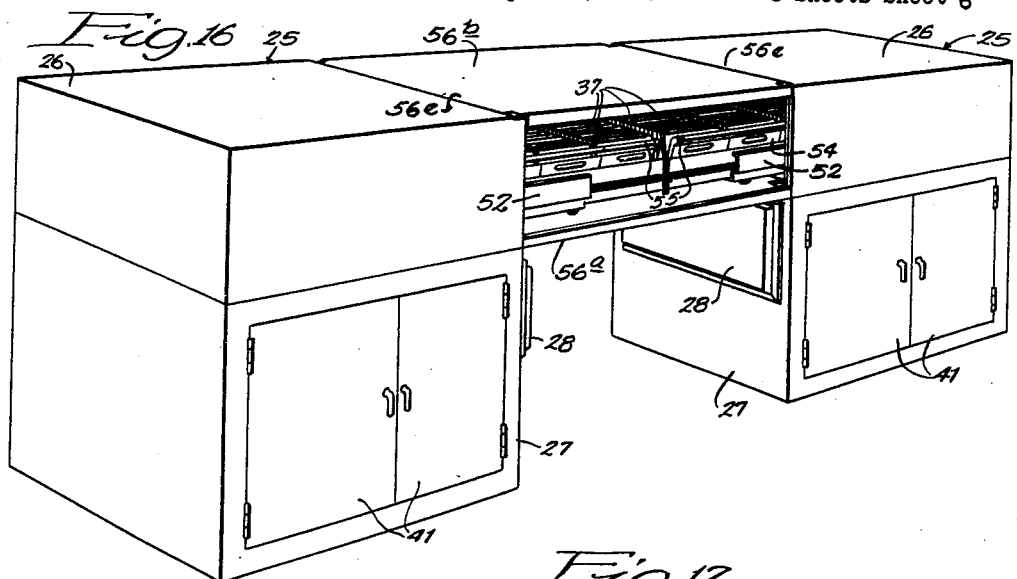
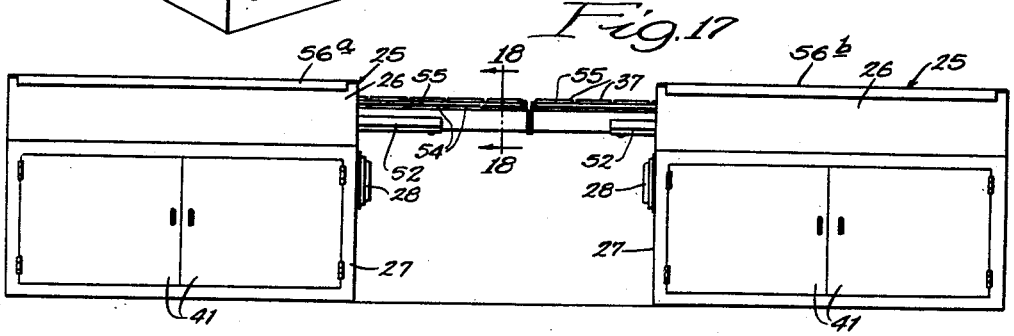
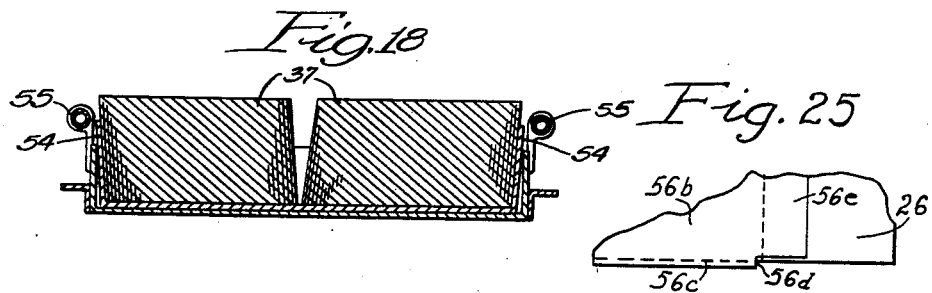
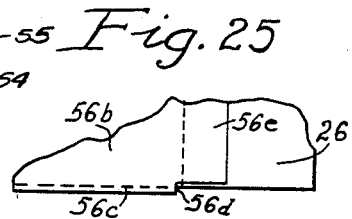
Inventor:
George C. Bruen,
By McCabb, Hunt & Dickinson
Attorneys.

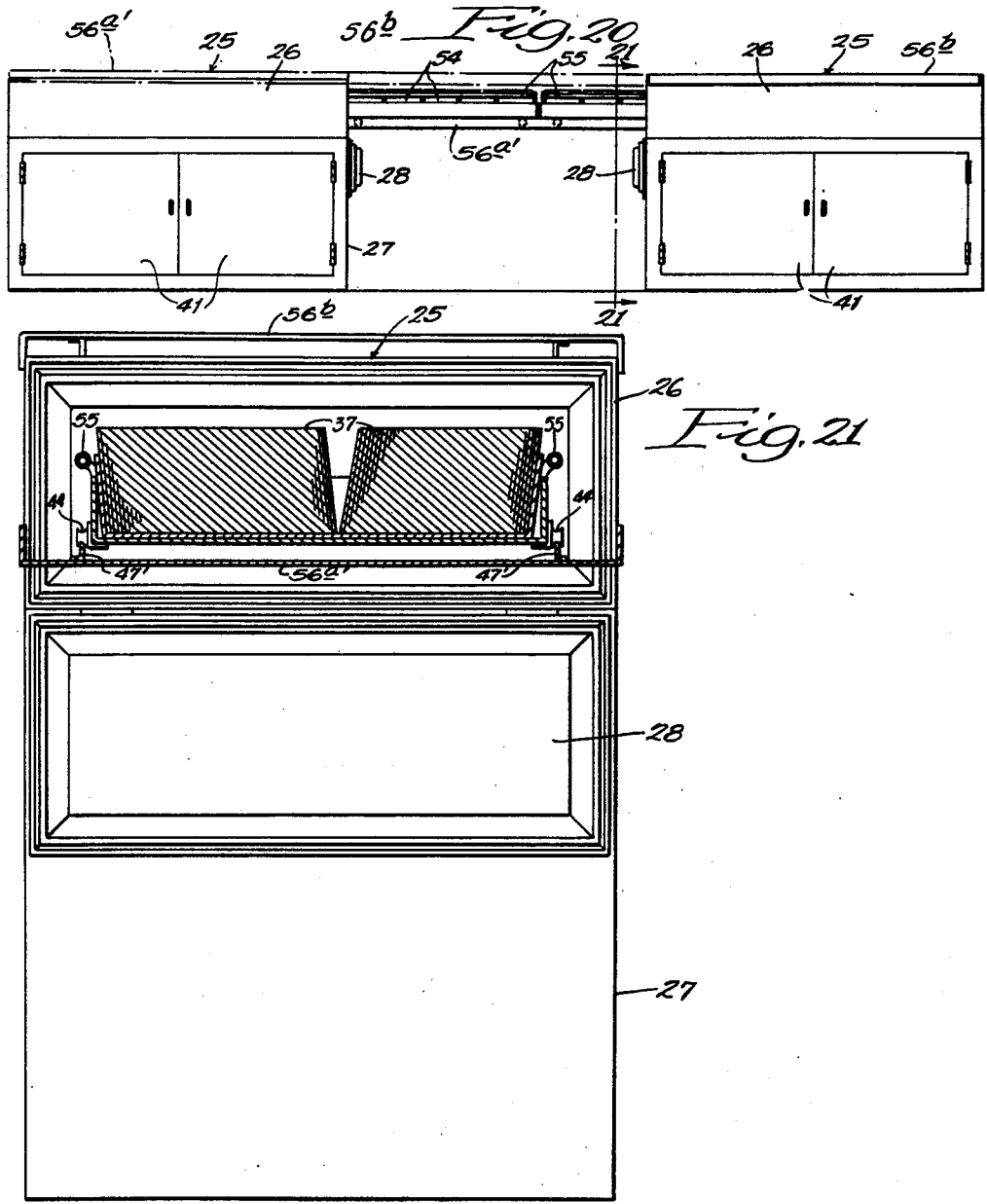

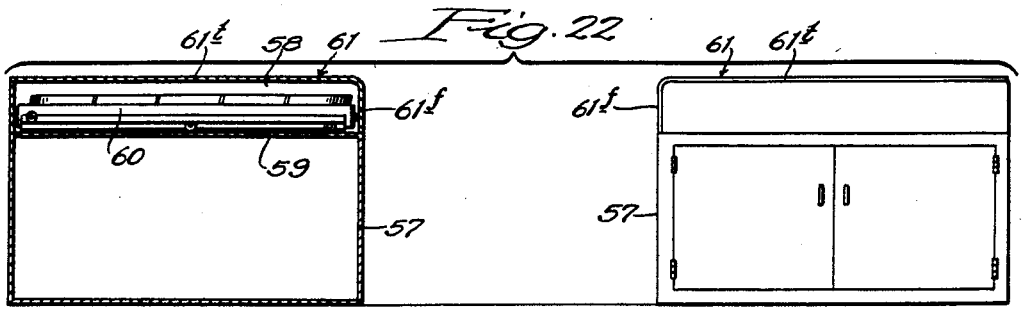
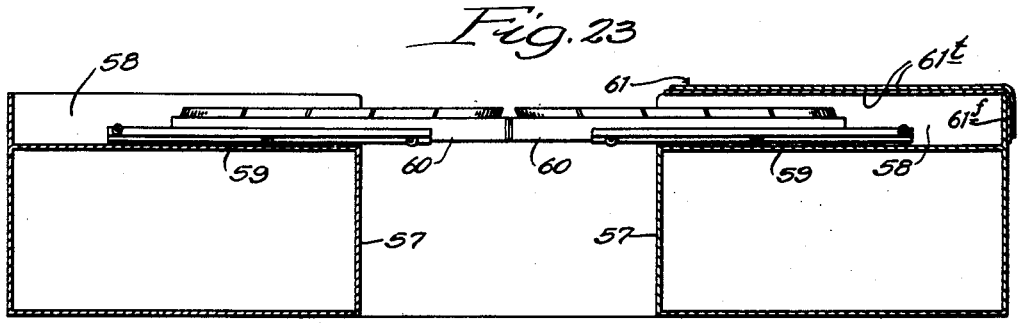
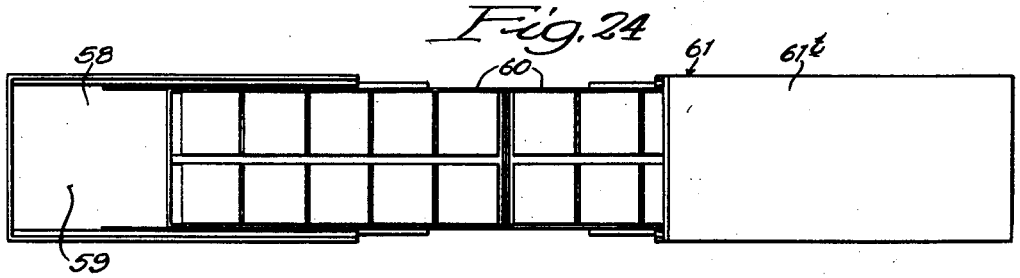

Patented Mar. 27, 1945 REISSUED 2,372,249

UNITED STATES PATENT OFFICE 2,372,249

CARD FILING EQUIPMENT

George C. Bruen, Chicago, Ill., assignor, by mesne assignments, of thirty-five and one-half percent to himself, thirty-five percent to Sophie E. Bruen, Chicago, Ill., five percent to Edna V. Dickinson, Highland Park, Ill., nine percent to Sarah M. Bullock, Wilmette, Ill., ten and one-half percent to G. A. Stuart, Washington, D. C., two percent to Jay Fisher, Chicago, Ill., one percent to Marie Thoenen, Elmwood Park, Ill., one percent to George H. Fredericksen, Chicago, Ill., and one percent to E. M. Thorsen, St. Joseph, Mo.

Application April 3, 1943, Serial No. 481,716

8 Claims. (Cl. 45—2)

My invention relates to filing equipment where records are kept on cards or the like and readily available to an operator for consultation thereof, or entries thereon, or both.

When thousands of cards must be available to one operator, it is impossible to place all of the cards within the rather limited field wherein any card may be consulted within ready reading range without the necessity of the operator making fatiguing shifts of her body. For efficiency, from the standpoint of both speed and the elimination of operator fatigue, it is desirable that when there are more cards to be made available than can be accommodated within that rather limited field, the other cards be brought into that field for consultation, that is, that the cards be brought to the operator instead of the operator to the cards.

In accordance with this principle, it has been a practice to put the cards in a long tray which is longitudinally shifted through the operator's working field. That long card tray is shiftably mounted in a still longer cabinet—the cabinet usually three to five feet longer than the tray. When the trays are long enough to accommodate thousands of sizable cards, the length of the cabinet may be three to six times the length of the cabinet of an ordinary piece of filing equipment. Thus such cabinets are unwieldy—unwieldy in crating, in shipping, in moving through doorways for installation, and also for floor plan lay-out for batteries of the cabinets.

But even more serious, it has not been feasible to house such equipment in fireproof cabinets, both because the design does not adapt the cabinet to being effectively closed and because the weight of so large a single cabinet—if of fireproof construction—would be prohibitive.

One object of my invention is to provide filing equipment which makes thousands of sizable cards available to inspection by an operator within her most convenient working field by this principle of bringing the cards to the operator, but where the above mentioned objections to present filing equipment are avoided—that is, where the cabinet units are kept small for convenience in crating, shipping and handling, where they are more flexible in battery lay-out in an office, where the cabinets are feasibly made of fireproof construction which can be effectively closed off whenever the cards are not being consulted, and where the weight of the cabinet units, despite the fireproof construction, is not prohibitive for ready handling.

Another advantage of my invention is that whenever the cards are not being actively consulted they may be readily locked up and stored within their fireproof and burglar-proof cabinets, and the inside lengths of the cabinets need not be any longer than the card trays, that is, the shifting of the card trays is effected in my invention without having to make the cabinet considerably longer than the tray.

Another advantage of my invention is that the cabinet construction, when the cards are not being actively consulted, may readily be converted into a large flat-topped desk; but whether or not the cabinet structure is thus converted, it always offers a sizable flat counter-height surface area within reach of the operator.

My invention is adaptable to either longitudinal or crosswise filing of the cards.

The foregoing, together with further objects, features and advantages of my invention are set forth in the following description of specific embodiments thereof as illustrated in the accompanying drawings wherein:

Figs. 1 to 8 inclusive show one form;

Fig. 9 shows a slight modification of the first form, whereby the door of the insulated cabinet is hinged at the cabinet top;

Figs. 10 to 13 inclusive show a second form employing a drawer track rather than a drawer suspension;

Figs. 14 and 15 show a third form using half-width drawers mounted side by side by individual drawer suspensions;

Figs. 16 to 19 inclusive show a fourth form in which the rows of cards are filed crosswise of the drawer and it is intended that the operator will sit with her knees under the drawers, the drawers being supported by drawer suspensions;

Figs. 20 and 21 show a fifth form similar to the fourth form but with the drawers supported on tracks; and Figs. 22, 23, and 24 show a sixth form of my invention in which the removal of the cabinet closure opens the top as well as the front of the drawer compartment of each cabinet and where, preferably, the compartment is not insulated.

More specifically: Fig. 1 shows a pair of cabinets in the proper spaced relation to give effect to my invention, the doors of the insulated compartments of the two cabinets being opened;

Fig. 2 is a similar view but with the drawers pulled out from the insulated cabinet compartments and coupled together;

Fig 3 is a fragmentary perspective taken on the line 3 of Fig. 2 showing the inter-front coupling for the drawers;

Fig. 4 is an end elevation of one of the cabinets of Fig. 1 with the door of the insulated cabinet open;

Fig. 5 is a transverse vertical section through the upper part of one of the cabinets and its drawer;

Fig. 6 is a longitudinal vertical section through one of the cabinets and its drawer;

Fig. 7 is a perspective view of one of the cabinets of Fig. 1 but with the door of the insulated cabinet closed and locked;

Fig. 8 is a floor plan lay-out of a battery of pairs of cabinets such as shown in Fig. 1;

Fig. 9 is a view of one of the cabinets similar to Fig. 7 but modified to show the door hinged at the top;

Fig. 10 is a plan view of a pair of cabinets similar to the cabinets of Fig. 1 but showing another plan in which the cabinets ride on tracks and a removable track bridges between the cabinets;

Fig. 11 is a vertical longitudinal section taken on the line 11—11 of Fig. 10;

Fig. 12 is a fragmentary transverse vertical section taken on the lines 12—12 of Figs. 10 and 11;

Fig. 13 is a fragmentary plan section taken on the lines 13—13 of Fig. 12;

Fig. 14 is a transverse vertical section of another form of cabinet similar to that of Fig. 1 but having a pair of side-by-side drawers each with its individual drawer suspension;

Fig. 15 is a longitudinal vertical section taken on the line 15—15 of Fig. 14;

Fig. 16 is a perspective view of a pair of cabinets embodying another form of my invention;

Fig. 17 is a side elevation thereof;

Fig. 18 is a transverse vertical section taken through one of the drawers on line 18—18 in Fig. 17;

Fig. 19 (sheet 5) is a longitudinal vertical section of the adjoining ends of the cabinets in Fig. 16;

Fig. 20 is a side elevation of a pair of cabinets showing another form of my invention similar to that of Fig. 17 but employing a track rather than a drawer suspension;

Fig. 21 is a vertical transverse section taken on the line 21—21 in Fig. 20 looking toward the end of one cabinet;

Fig. 22 is a side view of a pair of cabinets, one of which is in longitudinal vertical section of a sixth form of my invention, the drawers being stored within their respective cabinets and the closures being in closed position;

Fig. 23 is a similar view but with both cabinets in vertical section, with the drawers extended and coupled together and with one closure in open position; and Fig. 24 is a plan view of the equipment of Fig. 23.

Fig. 25 is a fragmentary top plan view showing the corner construction of the cover in Fig. 16.

Referring to Figs. 1 to 8, which illustrate the first form of my invention, a pair of similar cabinets 25 are set with their ends facing but spaced apart by a distance approximating the inside length of each cabinet. Each cabinet consists of an insulated cabinet section 26 set upon a non-insulated base section 27 to bring the top of the insulated section up to usual desk height. The construction of the insulated section 26 preferably follows the construction of that type of safe which employs inner and outer metal walls with an intervening layer of insulation and calculated to stand a one or two hour fire test. A similarly constructed door 28 is provided at the front end of the insulated section of the cabinet. It is hinged at its bottom by external hinge brackets 29 pivoted on the under side of the insulated cabinet and balanced by a counterweight 30 working within the base section at the far side thereof. When the cabinet is closed, as shown in Fig. 7, the door is secured by a lock 31. When it is opened, the counterweight 30 permits the door to swing to the dotted line position of Fig. 6, which is the horizontal position of Fig. 1.

Within each cabinet is a card drawer 32. It is extensibly supported in the cabinet by a drawer suspension 33 employing mechanism which may be a substantial duplication of the better type of filing cabinet drawer suspensions employing floating bars which carry rollers engaging fixed tracks in the cabinet and tracks on the drawer sides. The drawer suspension is such as to suspend the drawer when substantially fully withdrawn to make its entire capacity accessible from without. The drawer front 34, it will be understood, need not form a full closure as filing cabinet drawer fronts usually do; the door 28 is a fitted closure. Each drawer front has a finger slot 35 with beaded edges into which the fingers may be inserted to pull the drawer out. Each drawer front 34 also carries the complementary half of a coupling (Fig. 3) which comprises a coupling strip 36 fixed to the inside of the drawer front and having a hooked end occupying a mid position of a hole 37 through the drawer front. Preferably the bottom of the hole is spaced down from the coupling by little more than the width of the coupling strip; and the clearance between the top of the coupling strip and the top of the hole is similarly a little greater than the width of the strip. As shown in Fig. 3, when the two drawer fronts come together, this coupling mechanism permits their being intercoupled. The arrangement is such that both drawers can be identical; one does not have to be a right and the other a left.

To transform the equipment from the two closed cabinets, one of which is shown in Fig. 7, to the card consulting arrangement of Fig. 2, the doors of the two cabinets are unlocked and swung down to the horizontal position of Fig. 1, where they underlie the level of the drawers. Then the drawers are pulled out until their drawer fronts 34 meet. Then the front end of one drawer is lifted up a half an inch or so to drop its coupling hook behind the coupling hook of the other drawer front, as shown in Fig. 3. This couples the two drawers together so that they move as one on their respective drawer suspensions.

In the form of Figs. 1 to 8 the cards 37 are rather large—six by ten inches—and set on end in two rows extending longitudinally of the drawers. If the cards are still larger or are large sheets, they may be set in a single row. The drawers are shown with divider plates 38 subdividing the cards at intervals. The dividers are hinged to the bottom of the drawer as by projections extending into slots 39 in the drawer bottom.

In the form of Figs. 1 to 8, where the cards occupy considerable depth beneath the cabinet tops, which are preferably kept at about desk height, the operator cannot conveniently put her knees under the drawers. Therefore she sits sidewise of the coupled drawers reaching one or both hands over the exposed field of cards between the two cabinets. She shifts the two coupled drawers as a unit as required to bring the desired card into her field of convenient manipulation.

Shifting may be effected by pushing or pulling horizontally upon the cards. The spaced dividers 38, although hinged, keep the cards from shifting throughout the length of the entire drawer under such push or pull. Also, shifting of the coupled drawers may be conveniently effected by engaging the thumb or fingers on the transversely fluted obliquely presented upward margin 40 of the drawer side—especially of the near drawer side.

By my invention I get the effect of a long drawer full of cards shiftable past the operator to bring the desired cards into the zone of convenient inspection and manipulation by the operator without her having to move or substantially shift her body. But yet no structure of my equipment has to be much longer than half the length of the assembled cards.

The cards are readily put back in their fireproof housings by simply lifting the front of one drawer a half an inch or so to uncouple the drawer fronts, pushing the two drawers closed and closing the two cabinet doors. This leaves two sightly, self-contained, independent cabinets of convenient desk height and about the size of low conventional filing cabinets, with a clear space between them. Also, if it is necessary to inspect only cards in one of the drawers, that may be done without the necessity of opening the other cabinet.

The position of one of the cabinets in reference to the other need be only approximate. This avoids the necessity of fastening either cabinet to the floor and it eliminates the necessity of any spacing framework interposed between or connecting the two cabinets to insure a critical relative position. An error of an inch or so in the spacing of the cabinets will not defeat satisfactory operation as described. Nor is it necessary that the cabinets be in either horizontal or vertical alignment. The coupling between the drawer fronts affords something of a universal joint. And each drawer is supported only by a drawer suspension carried wholly by its own cabinet. Therefore one cabinet may be set a few degrees out of alignment with the other cabinet, without serious consequences. And the two cabinets may be set upon uneven floors so that they are not co-planar.

The tops of the two cabinets are sufficiently near standard desk height and also so near the tops of the cards, that one of the cabinet tops may conveniently be used as an arm rest by the operator. The tops of both cabinets may also be used for the convenient and nearby storage of papers and other things to which the operator should have convenient access.

The interior of the base sections 27 of the cabinets may be used for the storage of supplies or less active records. Ready access to the base interiors is provided by doors 41, on the near sides of the cabinets. The counter-weight 30 works on the far side of the cabinet where it will not interfere with the contents nor with access to the doors 41.

In Fig. 8 I have shown a floor plan lay-out of a battery of my paired cabinets, to illustrate how economical of floor space they are. Here there is a pair of the spaced-apart cabinets of Fig. 1 on the right of each operator's swivel chair 42 and another similar pair on the operator's left, with a narrow lateral space between the two pairs sufficient to accommodate the operator's chair and a small work table 43 whereon temporarily removed cards may be rested for entries. The far sides of cabinets may be placed together as shown, making for a most concentrated use of available floor space. When the cabinets of such a battery are closed for the night, a free aisle way is formed between the cabinet fronts, by shifting back the chairs, which is a practical convenience in cleaning the floors.

In Fig. 9 I have shown a modification of the foregoing form of my invention, in which the door of the insulated section is hinged at the top and when opened is swung upwardly to lie flat upon the top of the cabinet.

Referring to Figs. 12 to 13, which show a second form of my invention, instead of slidably supporting the drawers by the extension type of drawer suspensions the drawers have wheels which run on tracks.

Each drawer carries four wheels 44—two on each side, one near the front and one near the back of the drawer. Those wheels, which are pulley shaped, run on rod-like heads of channel rails 45 fixed along the lateral bottom edges of the interior of the insulated cabinet. When the drawers of this form are to be pulled out and coupled together the counter-balanced doors of the two cabinets are first opened and swung down to a horizontal position and then a removable bridging frame 46 is set between the cabinets to bridge therebetween at the level of the tracks. The bridging track 46 carries a pair of rails 47 which, when the frame is in position, constitute aligned extensions of the fixed rails 45. Extensions 48 at each corner of the bridging frame are adapted to extend into the bight of the adjoining channel rail 45 and to be registered therewith by locating pins or studs 49 which extend down into suitable holes in the web of the channel rails 45, as shown in Figs. 12 and 13.

With the aid of the rails on the bridging frame 46, the drawer wheels, when the drawers are pulled out, pass from the fixed rails 45 on to the bridging rails 47. Thus the coupled-together drawers may shift along a track which is about three times as long as one of the drawers.

An optional arrangement of dividers is shown in Fig. 11. Here each divider 50 is rigidly, rather than hingedly, mounted (as by welding) in the drawer and extends as high as the cards—or a little higher—with a rolled upper edge presenting a convenient bead to be engaged by the operator's fingers for pushing and pulling the coupled-together drawers to shift them.

I consider the arrangement in the first form of my invention to be preferable to that of Figs. 10 to 13 for most purposes, because the employment of the bridging track allows for less tolerance in the spacing apart of the two cabinets and in their alignment; because it involves the problem of storing the bridging frame when not in use; and because the inserting of the bridging frame involves more time in converting the cabinets from closed cabinets into operating position. But it is in advantage in supporting drawers which are extra heavy or extra long, where the ordinary extension type of drawer suspension might not be so rugged.

Referring to Figs. 14 and 15, which show a third form of my invention, the extension drawer suspension, rather than a bridging track, is employed. But here each cabinet has its drawers of half width, each with its own independent drawer suspension on both sides of the drawer. Thus each cabinet has a fixed case strip 51 at each side of its interior and a duplicate case strip 51' along the middle of its interior, and there are four floating extension bars 52 within each cabinet.

For still smaller cards, three or more drawers may be mounted side by side in each insulated cabinet section.

The cards may be contained in two or more trays 53 set in tandem in each drawer. A tray full of cards may conveniently be lifted out of the drawer and carried to another desk or office for temporary inspection there.

By using a plurality of side-by-side drawers in each cabinet, and by coupling the front of each drawer to the front of the drawer aligned with it in the opposite cabinet, I divide the cards among two or more pairs of coupled-together drawers, each coupled-together pair being shiftable independently of the others. In this way the weight of the coupled-together drawers and the cards which the operator has to push or pull in order to bring a desired card into the field of her convenient inspection, is materially reduced, and consequently the operating fatigue.

In Fig. 16 the cabinets are shown with the false cover 56b bridging the space between the working surfaces of the tops of the cabinets. Fig. 25 is a fragmentary view showing the corner construction of the false cover 56b in this position. False cover 56b has a depending flange 56c which fits outside the side wall of each adjacent cabinet, but is too short to engage the side walls of the cabinets in the position of Fig. 16. Depending flanges 56c terminate at 56d short of the end of the false cover and the projecting end portions 56e rest on top of each cabinet.

In Figs. 16 to 19 I have shown a fourth form of my invention which is particularly adapted to cards of sufficiently low height that the operator may conveniently place her knees under the drawers. Therefore she can sit facing the drawers and the cards may more conveniently be set in rows which extend transversely of the drawers. I prefer, as shown, to set each transverse row of cards in an individual transverse tray 54 which in turn is removably set transversely of the drawer. Because relatively shallow drawers may be used in this form, the insulated cabinet section which contains them is also rather shallow. In consequence the hinged insulated door is so small that it need not be counter-balanced and can, as shown, be swung down to vertical position against the front ends of the base sections of the cabinets.

When the operator faces the drawers, the field in which she can conveniently inspect and manipulate cards without having to shift her body is considerably larger than when she sits sidewise of the drawers. This is partly because the drawers can extend on both her right and her left and also because she can conveniently use both right and left hands for manipulating the cards. Therefore, a space between the two cabinets, which is normally determined more or less by that field of ready inspection, can be considerably longer and when that spacing between the cabinets is longer, each drawer can be that much longer. Consequently, and as best seen by comparison of Fig. 17 with Fig. 1, I have shown in this form a considerably longer cabinet and drawer, and a correspondingly longer space between the cabinets. This materially increases the number of cards which can be accommodated. Yet this does not necessarily involve more effort on the part of the operator in shifting the coupled-together pair of drawers with their increased number of cards, and this form, where the operator sits facing the drawers with her knees under the drawers, is feasible when the cards are smaller, and consequently although there are more cards to be shifted in the drawers in this form than in the form of Fig. 1, the weight of the shallower drawers and shallower cards is not necessarily greater.

When, as in this form, the operator sits facing the drawers, I prefer that the drawers be sifted by means of a tubular handrail 55 supported at least at the near side of each drawer a little below the tops of the cards. This handrail also forms a convenient hand or arm rest in inspecting the cards.

As indicated in Fig. 17 each cabinet of this form carries a false top, that of one cabinet being identified as 56a, and that of the other as 56b. These false tops have shallow marginal flanges whereby they are seated upon the primary tops of the cabinets. One of these false covers or tops 56a is removed, inverted, and set with its ends supported in the lower reaches of the door frames of the insulated compartments, as shown in Figs. 16 and 19 to underlie the extended drawers but above knee height. Thereby the false cover 56a serves as a knee guard to prevent the drawers shifting inadvertently and catching on the operator's clothing. An incidentally it serves to catch any dropped cards which might otherwise fall to the floor.

In a somewhat similar manner the false cover 56b of the other cabinet may be removed and set between the cabinets to lie substantially flush with the primary tops and thereby convert the two cabinets into what is virtually one long desk top. To accomplish this result, the end edge portions of the false cover 56b should rest on the tops of the adjacent cabinets 25, 25, which should be close enough together so that the depending side flanges on the false covers 56b have a substantial fit between the cabinets. This, of course, is done only when the cards are not being actively consulted but where it is desirable to have a large temporary working space at convenient desk height.

Because the insulated doors in this form are dropped down to vertical position where they lie against the fronts of the cabinets, they do not interfere with the operator's knees.

In Figs. 20 and 21, which illustrate a fifth form of my invention, the drawers are sufficiently shallow to permit the operator to put her legs beneath the drawers and sit facing the drawers. And consequently the cards are preferably filed crosswise of the drawers. But in lieu of the track suspensions shown in the form of Figs. 16 to 19, I employ tracks on which the drawers run, somewhat akin to the form of Fig. 10. In the form of Figs. 20 and 21, however, the bridging frame is in the form of a removable false top 56a' which on its underside has a pair of depending rails 47'. When this false top 56a' is removed from its cabinet, inverted, and set to bridge between the cabinets, as shown in Fig. 21, the rails 47' constitute extensions of the fixed track within the cabinet on which the drawer wheels roll. This, therefore, offers a solution to the problem of the convenient storage of the bridging frame 47 of Fig. 10, and at the same time provides a knee guard for the operator when she can sit facing the drawers.

Referring to Figs. 22, 23 and 24, which show a sixth form of my invention, each cabinet 57 has an upper drawer compartment 58. Each drawer compartment 58 is defined in part by a bottom 59 and by the extension thereabove of the back and side walls of the cabinet. But the top and front end of each drawer compartment 58 is open except as they are closed by a closure 61. Each closure 61 is L-shaped in side elevation and consists of a horizontal top closure portion 61t and a depending front closure portion 61f. To open the two cabinets for the withdrawal and coupling together of their drawers, the closure 61 of one of the cabinets—the right-hand cabinet in the drawings—is lifted from its seat upon the cabinet, turned end for end in a horizontal plane, and again set upon the cabinet with its portion 61t closing the top of that cabinet but with its depending end closure 61f lying more or less flatwise against the outside surface of the end wall of the drawer compartment, as shown in Fig. 23. Then the closure 61 of the other cabinet—the left-hand cabinet in the drawings—is removed therefrom and carried horizontally, without turning it end for end, to a position over the right-hand cabinet where it is set upon the first closure 61, with the two top portions 61t superposed and the two depending front closure portions lying substantially flatwise against each other.

Thus by this shifting around of the closures 61, the top of the drawer compartment 58 of the right-hand cabinet is closed but the front is left open, the two closures are disposed of in such a manner as to be relatively inconspicuous and out of sight and still preserve a working top surface on the right-hand cabinet which the operator may conveniently use for storing papers or even for writing on them. And also by this shifting of the closures, both the front and top of the left-hand cabinet compartment is left open.

The respective drawers 60 are then pulled out and intercoupled in the manner previously described.

This form of my invention has the advantage of exposing a region, longer than the gap between cabinets, within which the operator may examine cards. Also, it facilitates inspection where a second operator sits on the other side of the same cabinets and inspects cards in the drawers.

The opening of the top of one of the drawer compartments in this form of my invention also facilitates the casual finding and inspection or removal by one, other than the attendant operator, who may walk up to the file for that purpose without sitting down at the file.

I have not shown the drawer compartment in this form of my invention as being insulated, because of the burden on the operator of lifting and handling so large a closure were it of the weight required for fireproof construction, and also because of the long perimeter along which a fireproof seal would have to be made in intersecting planes.

In all forms of my invention illustrated, when the drawers are uncoupled and shifted back into their respective compartments and the doors closed or the closures put in place, the two cabinets are quite independent of each other and each has the appearance of a normal-sized desk-height cabinet in keeping with other standard office desks, tables, and cabinets. My equipment therefore does not appear conspicuously out of place because of excessive length or bulk, even though it may be heavily fireproofed.

Also, in all of the forms of my invention here illustrated, the two cabinet units, with their respective drawers, constitute identical units. That is, one does not have to be specially made as a right and the other as a left. Even where the insulated door has a counterweight, as shown in Fig. 6, its shank has a detachable threaded connection 39' with a threaded stud on the hinge bracket 29 depending below the pivot pin bearing. Thus when the units are assembled for installation the counterweight may be attached to either one of the two hinge brackets 29 of the drawer. Thereby the counter-balance can be put at that side of each cabinet base which will be remote from the operator, so that the swinging of the counterweight will not interfere with access to the interior of the base through the doors 41. The bases themselves need not be rights and lefts. The doors 41 may be duplicated on the remote side. Or, if the doors 41 are employed only on one side of each base, then the two ends will be made alike in that both ends will provide vertical slots for the door hinge brackets 29.

As previously explained, the inter-drawer coupling members of Fig. 3 are so arranged that the drawer fronts need not be made in rights and lefts.

Where there are side-by-side drawers, as in Figs. 14 and 15, a second operator seated on the far side may work simultaneously on the far side tandem-coupled drawers, shifting them independently of the near side drawers worked upon by the first operator.

While I have described and illustrated these specific forms of my invention, I contemplate that many changes and substitutions may be made without departing from the scope and spirit of my invention.

I claim:

1. Fireproof card filing equipment comprising a pair of cabinets each having an insulated vault-like upper section, a base section therebeneath for supporting the vault-like section on the floor of a room with its top at desk height, and an insulated door for the vault-like section, a card drawer for each vault-like section, of length approximating the interior length thereof, and a floating bar type extensible drawer suspension in each vault-like section and on its drawer for slidably supporting the drawer for horizontal reciprocation whereby the drawer may be fully inserted for closing of the door and withdrawn to expose substantially its length, the two cabinets being set with their doored ends facing and spaced apart by a distance approximating the length of a drawer, and a releasable coupling temporarily coupling the drawers with their front ends together whereby the two drawers may be shifted as a unit into and out of their respective cabinets each upon its own drawer suspension.

2. Card filing equipment according to claim 1 wherein the undersides of the extended drawers are high enough to accommodate therebeneath the knees of a seated operator, and removable transverse trays in said drawers wherein cards may be arranged within the drawers in transverse rows, whereby the operator may directly face the cards.

3. Card filing equipment according to claim 1 wherein the undersides of the extended drawers are high enough to accommodate therebeneath the knees of a seated operator, and removable transverse trays in said drawers wherein cards may be arranged within the drawers in transverse rows, whereby the operator may directly face the cards, and wherein a removable horizontal knee guard is temporarily interposed between the cabinets and closely beneath, but independent of, the extended drawers.

4. Card filing equipment according to claim 1, wherein each vault-like cabinet section receives a second drawer at the side of the first drawer, wherein there are extensible drawer suspensions for the second drawers whereby they reciprocate independently of the first drawers, and wherein the second drawers are similarly detachably coupled together to reciprocate as a unit independently of the first drawers.

5. Card filing equipment according to claim 1 wherein the two cabinets are positionally independent of each other, save for their resting on a common floor of a room and for the inter-drawer coupling.

6. Card filing equipment according to claim 1 wherein the inter-drawer coupling affords substantial pivotal joint movement as between the drawers, whereby operatively to allow substantial angularity of position as between the two cabinets.

7. Record filing equipment comprising a pair of cabinets each having an opening for the passage into the cabinet of one of the hereinafter mentioned drawers and a door for the opening to close up the compartment when the drawer is stored therein, a drawer for each compartment of a length approximating the interior length of the compartment, a cabinet-carried drawer suspension for each drawer supporting the drawer for horizontal reciprocation into and out from the compartment, the cabinets being set with their openings facing each other and spaced apart a distance of substantially a drawer length with the drawers in substantial alignment, and a releasable coupling for temporarily connecting the drawers together end to end to shift longitudinally as a unit.

8. A filing equipment comprising a pair of cabinets, each of said cabinets being provided with an opening in one of its vertical sides for receiving a drawer, and said openings being arranged in opposition to each other, with the cabinets spaced by an amount substantially equal to the length of a drawer, a drawer in the opening of each cabinet, and means for slidably mounting the drawers in their respective cabinets, said drawers being arranged in substantial alignment with each other, and connecting means carried by the abutting ends of the drawers for temporarily connecting the drawers together and permitting a limited lateral movement and limited pivotal movement between said drawers whereby the two drawers may be caused to move in tandem as a unit and the records carried by the two drawers are accessible in the space between the two drawers, said connecting means comprising a pair of oppositely disposed inter-engaging members, each having a recess for receiving the edge of the other.

GEORGE C. BRUEN.